United States Patent [19]
Boor

[11] 3,741,041
[45] June 26, 1973

[54] SPEED REDUCTION GEAR ASSEMBLY
[75] Inventor: Francis H. Boor, Lafayette, Ind.
[73] Assignee: Fairfield Manufacturing Co., Lafayette, Ind.
[22] Filed: Aug. 19, 1971
[21] Appl. No.: 172,998

[52] U.S. Cl. ................................................. 74/801
[51] Int. Cl. ............................................. F16h 1/28
[58] Field of Search ..................................... 74/801

[56] References Cited
UNITED STATES PATENTS
2,220,174  11/1940  Ravigneaux ...................... 74/763 X
2,810,844  10/1957  Morrill ............................. 74/801 X
2,950,635  8/1960  Bieger et al ...................... 74/801 X
3,120,764  2/1964  Berlinger, Jr. et al ............... 74/801

Primary Examiner—Arthur T. McKeon
Attorney—Verne A. Trask et al.

[57] ABSTRACT

A speed reduction gear assembly wherein a large speed reduction is realized from input to output using a minimum of four gears. The input is coaxial with the output. The large gear reduction is a result of the effective rolling center of one of the gears being located at a predeterminable radial point other than on the pitch diameter of the gear it is driving. Alternative embodiments are provided which allow, through the use of additional gears, the transfer of a large amount of torque and permit the rotational output to be taken on the input side of the gear assembly.

5 Claims, 6 Drawing Figures

SPEED REDUCTION GEAR ASSEMBLY

BACKGROUND OF THE INVENTION

The present invention relates to a compact gear assembly which effects a large speed reduction with a minimal number of gears. Heretofore, nominal speed reductions have been obtained using a compound planetary gear train or coupled singular planetary gear trains. The singular planetary gear configuration or single epicyclic train consists of a sun pinion gear, a planet gear, and an internally toothed ring gear. The planet gear is in mesh with the sun gear and the internally toothed ring gear. The sun gear is rotated to drive the planet gear which in turn causes the internal ring gear to rotate. If the internal ring gear is held in position, the planet gear not only rotates but orbits the sun gear within the stationary internal ring gear.

A double planetray gear train has a planet gear with its axis rotatably connected to a spider which is rotated by the orbital movement of the planet gear about a sun gear. A second sun gear is connected to the spider and rotated thereby to drive a second planet gear. This planet gear orbits the sun gear within a second stationary ring gear. The output may be taken from a second spider connected to the axis of the second planet gear. A number of single planetary stages may be built up in this way to effect a nominal reduction in speed between the coaxial input and output shafts.

A compound planetary gear comprises a sun gear, an internally toothed ring gear, two planet gears mounted on the same axis and an output gear. The first planet gear orbits the sun gear within and in mesh with the internal ring gear. The second planet gear is rotated by the first and in turn drives the output gear.

Each stage of the multi-stage planetary can effect a reduction in the practical range of 3:1 to 8:1. Therefore for a two stage planetary train the largest reduction would be in the range of 60 or 70:1. This would require a minimum of six gears. More planet gears would have to be added to effect a proportional increase in torque transfer capacity. The addition of planets would not alter the speed reduction. Conventionally a minimum of three planet gears per stage would be used for nominal torque transfer. This would require a total of ten gears for a maximum reduction of about 70:1.

The compound gear assemblies utilize cluster gears mounted on the planet gear shafts to drive a subsequent stage as the three or more planet gears in the first stage and their shafts are rotated. Cluster gears are multiple gears cut on a single axis under the requirement that the two sets of teeth be properly aligned with each other. Cluster gears necessitate meticulous mounting techniques for equal load distribution between the three planets.

It is therefore an object of this invention to provide a compact gear train capable of a large speed reduction with a minimum number of gears requiring no alignment between gears and to effect this reduction with a large and concurrent torque transfer.

SUMMARY OF THE INVENTION

In accordance with the invention, a large gear reduction is obtained using a minimum of four gears. Two of the gears, a drive pinion and a planet idler pinion may be rotatably mounted in a fixed relationship with one another in a rotating carrier. The carrier may be mounted on an input shaft. The drive pinion and the planet idler pinion are positioned so as to mesh with each other. The planet idler pinion also meshes with an internally toothed ring gear which is mounted in a fixed position. The drive pinion, on the other hand, also meshes with an output gear mounted on the output shaft which is coaxial with the input shaft and the internally toothed ring gear.

In operation, the input shaft rotates the pinion carrier. The planet idler pinion, being engaged with the internal ring gear, rotates about its own axis and orbits about the center of the internal ring gear due to the rotating carrier. The planet idler pinion in turn rotates or drives the drive pinion which turns the output gear. It has been found that the planet idler pinion has an effective rolling center which is located on the pitch diameter of the internally toothed ring gear. The drive pinion, being held in the carrier in a fixed relationship with the planet idler pinion and driven thereby, also rotates about an effective rolling center located on the pitch diameter of the internal ring gear. The output gear, which preferably has a pitch diameter less than that of the internal ring gear, is driven by the drive pinion. It has been found that the speed of the output gear is related to this difference in pitch diameter between the output gear and the internal ring gear. The speed reduction for this gear configuration has been found to be equal to the number of teeth in the output gear divided by the difference between the number of teeth in the output gear and the number of teeth in the internal ring gear. The number of teeth in the drive pinion and the planet idler pinion do not affect the ratio. For example, with an internal ring gear having 67 teeth and an output gear having 66 teeth the speed reduction ration would be 66 to 1.

Alternatively, a sun gear may be mounted on the input shaft in mesh with the planet idler pinion. In this case, the planet idler and drive pinion carrier is rotated by the orbiting of the planet idler pinion about the sun gear within the internally toothed ring gear. Again, the planet idler pinion and the drive pinion mesh with each other and rotate on a moving effective rolling center which is on the pitch diameter of the internal ring gear. The speed reduction has now been increased, by the addition of a single gear, on the order of 3 to 8 times. The speed reduction obtained has been found to be the quantity obtained by adding the number of teeth in the sun gear to the number of teeth in the internal ring gear divided by the number of teeth in the sun gear, times the quantity found by taking the number of teeth in the output gear divided by the number of teeth in the internal ring gear minus the number of teeth in the output gear. It may be seen that by substituting appropriate tooth numbers in this equation that the gear ratio available is quite high, especially since only a total of five gears are used.

Multiple planet idler pinions may be added to both of the above configurations to increase the torque transfer capabilities of the assembly. In such case, each planet idler pinion would have a drive pinion in mesh with it. The speed reduction ratio would not be changed.

A larger gear reduction may be obtained by constructing a multiple stage assembly, either with or without an input pinion. In this instance, the drive pinion meshes with a gear to rotate the second stage pinion carrier or input pinion as the case may be. The speed reduction ratio may be determined by multiplying the speed reduction ratios of each of the stages together.

While the preferred embodiment uses a fixed internally toothed ring gear and a rotatable output gear, it will be understood that the gear driven by the drive pinion could be fixed and the output taken from the internal ring gear which would be permitted to rotate. In addition, and also within the scope of my invention, while the input and output shafts are coaxial, they need not be on opposite ends of the gear train but may be on the same end or side.

BRIEF DESCRIPTION OF THE DRAWINGS

The accompanying drawings illustrate the invention and, by way of example, show preferred embodiments of the invention. In such drawings.

DETAILED DESCRIPTION OF THE PREFERRED EMBODIMENT

Figure 1:
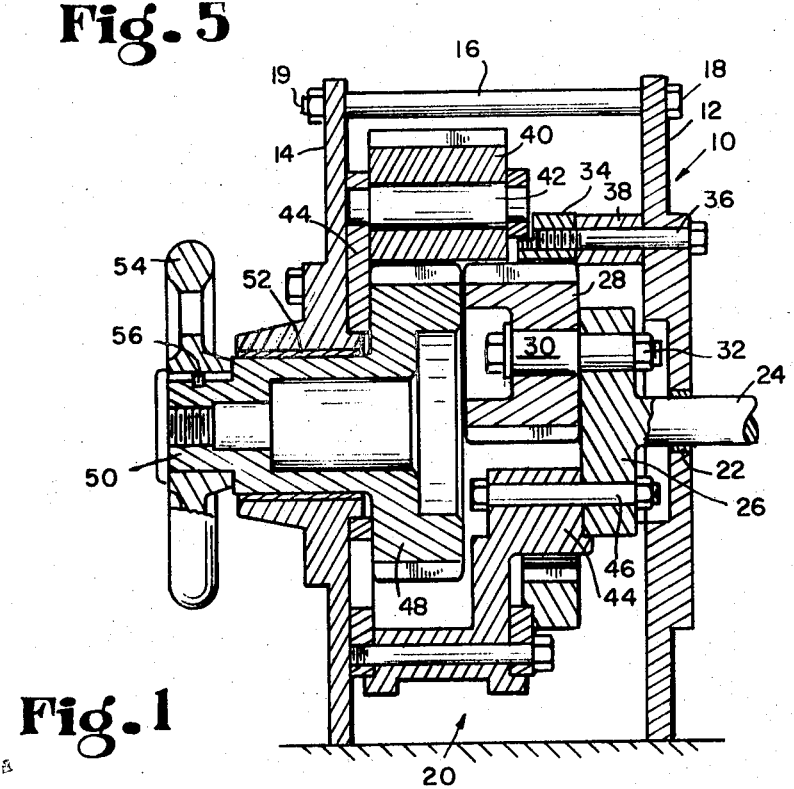
FIG. 1 is an axial section of a gear assembly embodying the invention.

An apparatus embodying my invention is shown in FIG. 1, and generally comprises a housing 10 with front and rear panels 12 and 14. These two panels are held together as by an elongated sleeve 16, bolt 18 and nut 19. The housing 10 supports and partially encloses a reduction gear assembly 20. The lower portion of the housing 10 may be sealed and partially filled with an oil or other lubricant for the assembly 20 to pass through for lubrication purposes. A bushing 22 in the right-hand panel 12, as shown in FIG. 1, rotatably supports an input shaft 24 for the gear assembly 20. A flange 26 is formed on, or attached to, the input shaft 24 within the housing 10. A planet idler pinion 28 is rotatably mounted by means of a bushing 30 in a fixed axial position on the flange 26, as by a bolt 32. The planet idler pinion 28 meshes with an internally toothed ring gear 34 which is mounted in fixed relationship with the right plate 12 by a bolt 36 and spacer 38. The planet idler pinion 28 extends beyond the face of the internal ring gear 34 and meshes with a drive pinion 40. This drive pinion 40 is rotatably mounted by means of a bushing 42 in a pinion carrier 44. The carrier 44 is also connected, by means of a bolt 46, to the flange 26 on the input shaft 24.

The drive pinion 40 extends beyond the face of the planet pinion 28 and meshes with an output gear 48. This gear 48 is cut on or attached to an output shaft 50 which extends through and is supported in the left plate 14 of the housing 10 by a bushing or bearing block 52. An output device such as a sprocket gear 54 may be attached as by a key 56 to the output shaft 50.

In operation, the input shaft 24 may be rotated at a high speed as by an electric motor. The rotating shaft 24 rotates the flange 26. The axis of the planet idler pinion 28 being carried on this flange 26 is thereby rotated in a circular path as is the axis of the drive pinion 40 being carried in the pinion carrier 44 also attached to this flange 26. The planet idler pinion 28 also rotates about its own axis due to its meshing engagement with the internal ring gear 34. The drive pinion 40 rotates about its own axis due to its meshing engagement with the planet idler pinion 28. The drive pinion 40 meshes with and turns the output gear 48 as it is orbited about that gear by the pinion carrier 44.

The speed or gear reduction obtained from the reduction gear assembly above described has been found to be the number attained by dividing the number of teeth in the output gear 48 by the quantity found by taking the number of teeth in the internal ring gear 44 minus the number of teeth in the output gear 48. For example, if the internal ring gear has 67 teeth and the output gear has 66 teeth, the speed reduction would be 66 divided by 67 minus 66 or 66:1.

Figure 2:
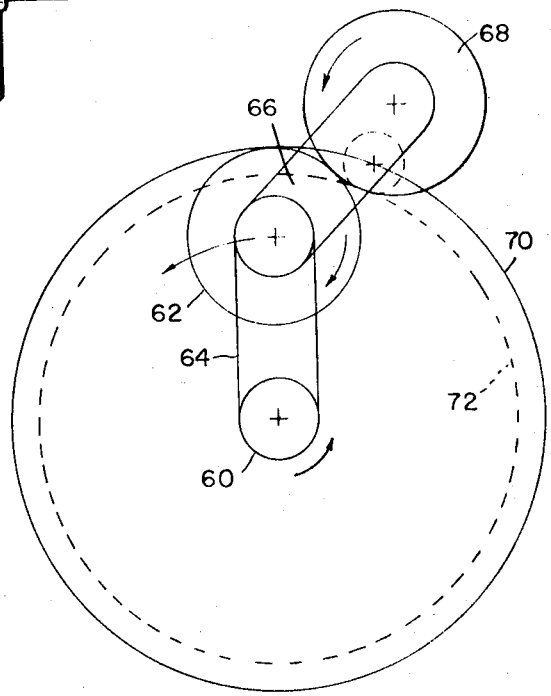
FIG. 2 is a diagrammatic showing of the embodiment of FIG. 1.

The large gear reduction obtained with this configuration which utilizes only four gears may be explained with reference to the diagrammatical showing of FIG. 2. In the diagram, an input shaft 60 turns in a counterclockwise direction. A planet idler pinion 62 is connected to the input shaft 60 by a connecting member 64. This member 64 corresponds to the flange 26 on the input shaft 24 in FIG. 1. A second connecting member 66 connects the axis of a drive pinion 68 in a fixed relationship to that of the planet idler pinion 62. This corresponds, in FIG. 1, to the pinion carrier 44. If the input shaft 60 in FIG. 2 is turned in a counterclockwise direction, the axes of the drive pinion 68 and planet idler pinion 62 also travel in a counterclockwise circular path. The angular relationship between the member 66 connecting the two pinions and the member 64 connecting the planet pinion and the input shaft is fixed and does not change during rotation. The planet idler pinion 62 and drive pinion 68 also rotate about their axes due to their engagement with each other and with the internal ring gear 70 and output gear 72 respectively. It has been found that the planet idler pinion 62 has an effective rolling center during rotation on the pitch diameter of the internal ring gear 70. Furthermore, the drive pinion also rotates about an effective rolling center which is also located on the pitch diameter of the internal ring gear 70 due to the fixed relationship of the drive pinion to the planet idler pinion and since the two pinions rotate at the same speed. The drive pinion 68 is also in mesh with the output gear 72. The effective rolling center of the drive pinion is, however, located on the ring gear which is larger in pitch diameter than the output gear. It is the offsetting of the effective rolling center of the drive pinion 68 from the pitch diameter of the output gear 72 which incurs a large speed reduction.

By way of explanation, if the ring gear and the planet idler pinion were removed, the axis of the drive pinion 68 were fixed in position and the pinion 68 rotated in mesh with the output gear 72, the speed reduction would be equal to the number of teeth or pitch diameter of the otuput gear divided by the number of teeth or pitch diameter of the drive pinion. The effective rolling center of the drive pinion in this case would be located at the center of the drive pinion.

However, if the drive pinion were rotated and its axis free to move, the drive pinion would become a planetary pinion and rotate about its own axis as well as orbit about the output gear. In this instance, the effective rolling center of the drive pinion would be on the pitch diameter of the output gear and the speed reduction would be infinite. By reinstating the planet idler pinion and internal ring gear and using them to locate the effective rolling center of the drive pinion at a radial position on the drive pinion somewhere between the center of the drive pinion and the extremities of the pitch diameter of the output gear many different desired gear reductions may be obtained.

Figure 3:
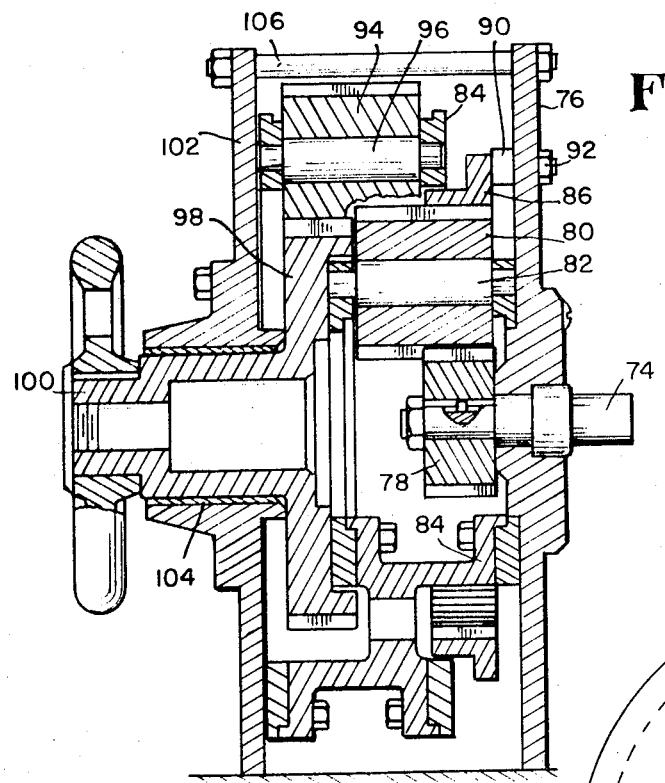
FIG. 3 is an axial section of an alternative embodiment of the assembly of FIG. 1.

Another embodiment of my invention is illustrated in FIG. 3. An input shaft 74 extends through and is rotatably supported in a housing mmeber 76 on the input side of the apparatus. An input pinion 78 is mounted on and keyed to the internal end of the input shaft 74. A planet idler pinion gear 80 is rotatably mounted on a bushing 82 in a pinion carrier 84. The planet idler pinion 80 meshes with the input pinion 78 and an internally toothed ring gear 86. The internal ring gear 86 is held in position by a spacer 90 and a bolt 92. A drive pinion 94 is rotatably mounted by means of a bushing 96 in the pinion carrier 84. The idler planet pinion 80 also meshes with the drive pinion 94. The position of the drive pinion 94 with respect to the planet idler pinion 80 is fixed by their mountings in the carrier 84. This position is determined by the pitch diameter of an output gear 98. The drive pinion 94 must be positioned within the carrier so that it meshes both the planet idler pinion and the output gear 98.

The shaft 100 carrying the output gear extends through and is supported in a panel 102 on the output side of the apparatus by a bushing 104. This panel 102 and the panel 76 on the input side are held together as by a plurality of bolts and sleeves 106.

In operation, the input shaft 74 is rotated to drive the input pinion 78. This pinion rotates the planet idler pinion 80. The planet idler pinion 80, in addition to rotating about its own axis, orbits within the internal ring gear 86. The drive pinion 94 is rotarily driven by the planet idler pinion 80 and also orbits therewith due to the fixed relationship of the two pinions within the pinion carrier 84. The drive pinion 94, as it rotates and orbits, drives the output gear 98 which turns the output shaft 100. The speed reduction obtainable with this assembly is equal to the sum of the number of teeth in the internal ring gear 86 and the number of teeth in the input pinion 78 all divided by the number of teeth in the input pinion 78 and then the quotient taken times the number of teeth in the output gear 98 divided by the difference in the number of teeth between the internal ring gear 86 and the output gear 98.

In an apparatus where more torque transfer is required, multiple idler planet and drive pinion pairs may be added. The input pinion, the pinion carrier and the internal ring gear should then be permitted to move slightly with respect to one another so that they can seek their own center. For the ring gear, the slight movement required can be effected by loosely mounting it on pins instead of the illustrated bolts 92. This is done because the planet idler pinion gears cannot each be cut exactly the same. Each planet idler pinion may also have two drive pinions associated therewith to effect an even larger torque transfer to the output gear.

Figure 5:
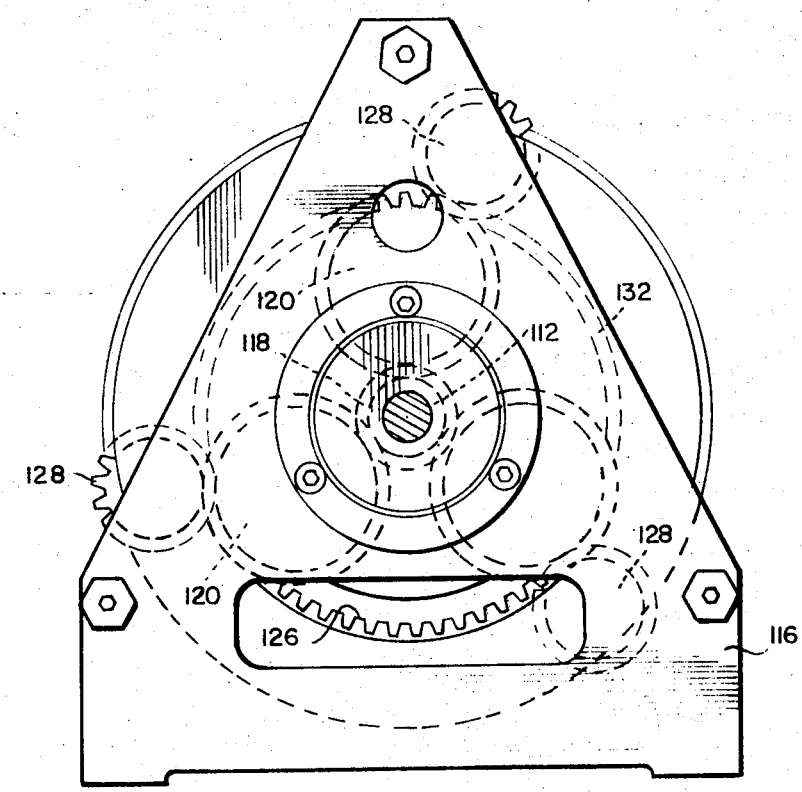
FIG. 5 is an end view of the assembly shown in FIG. 4.
Figure 4:
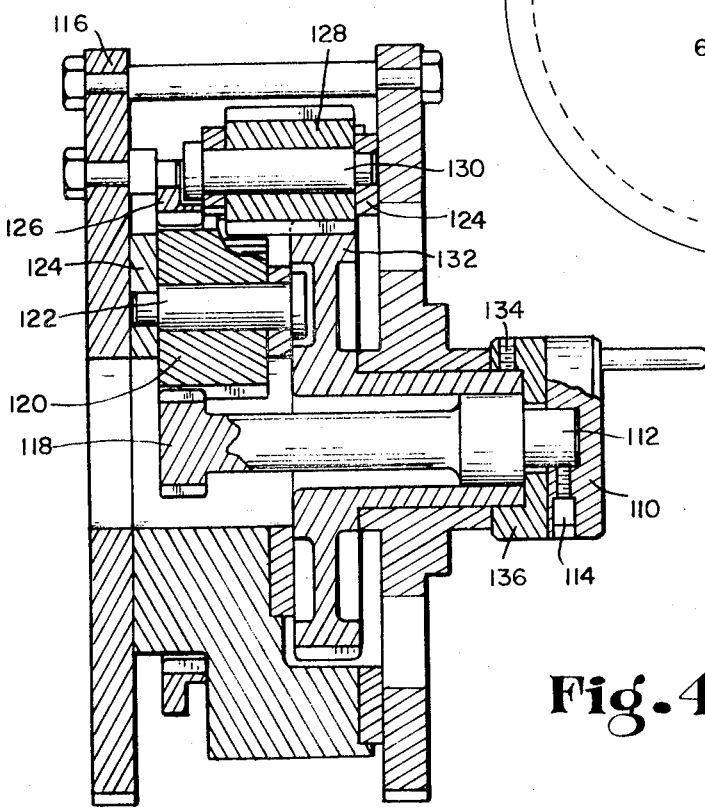
FIG. 4 is an axial section of another alternative embodiment of the assembly of FIG. 1.

A gear assembly is illustrated in FIGS. 4 and 5 which permits the input and output to be taken coaxially on the same side of the apparatus. In this configuration, the input is supplied to a collar 110 which is connected on an input shaft 112 by a set screw 114. The input shaft is unsupported except for the collar 110 and extends almost the complete width of the housing 116 and is culminated in an input pinion 118. This pinion 118 is in mesh with three planet idler pinions 120 which are rotatably mounted on bushings 122 in a pinion carrier 124. The planet idlers 120 mesh with an internally toothed ring gear 126 and a like number of drive pinions 128 which, like the planet idler pinions, are rotatably mounted on bushings 130 in the pinion carrier 124. The input pinion 118 is rotated by the input collar 110 to rotate the planet idler pinions 120 which cause them to orbit about the input pinion within the internal ring gear 126. The drive pinions 128, in fixed relationship with the planet idler pinions within the pinion carrier 124, are rotated by the planet idler pinions and orbit therewith to drive the output gear 132 which is connected by a set screw 134 to an output collar 136. The speed reduction ratio of this apparatus is determined by the same formula as the apparatus of FIG. 3. Again, the number of planet idler pinions and drive pinions may be increased, e.g. to four or five, to effect an increase in the torque tranfer capabilities of the assembly.

Figure 6:
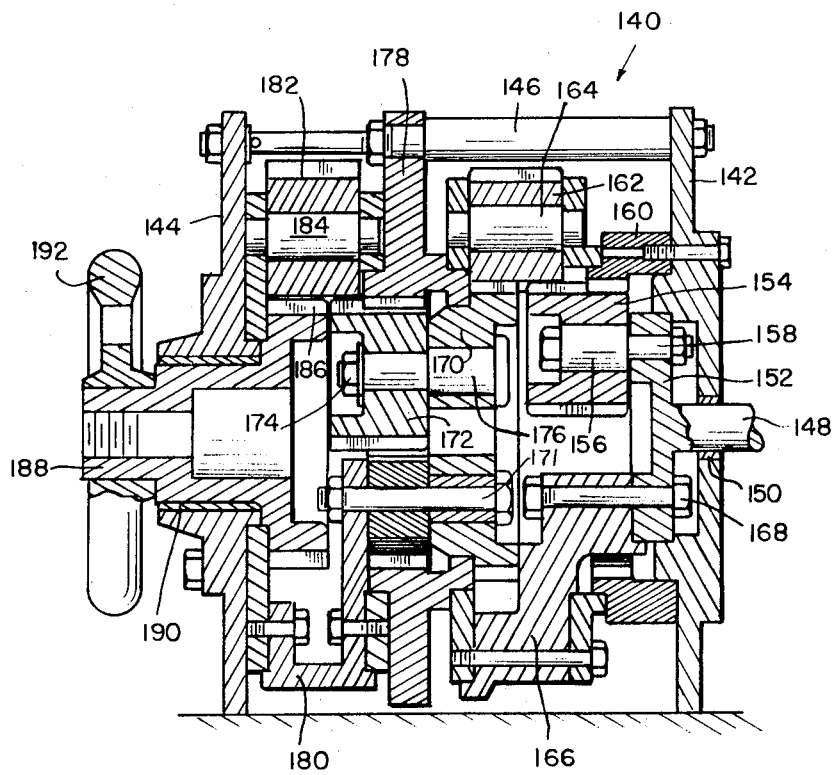
FIG. 6 is a multiple stage gear assembly embodying the invention.

A multiple stage gear assembly embodying my invention is shown in FIG. 6. This device comprises a housing 140 which is comprised of a panel on the input side 142 and a panel on the output side 144 held together as by a bolt and spacer sleeve arrangement 146. Input is provided by an input shaft 148 which is mounted in a bushing 150 in the input side panel 142. The input shaft 148 is connected to or formed as part of a circular flange 152 within the housing 140. A planet idler pinion 154 is rotatably mounted on a bushing 156 and mounted by means of a bolt 158 to this circular flange 152. The planet idler pinion 154 is in mesh with an internal ring gear 160 which is connected to the input panel 142. It is also in mesh with a drive pinion 162 which is rotatably mounted on a bushing 164 in a pinion carrier 166. This pinion carrier is also connected, by means of a bolt 168, to the circular flange 152 on the input shaft 148. As the input shaft 148 turns, it carries with it the planet idler pinion 154 and the drive pinion carrier 166 in a fixed relationship. The planet idler pinion 154 rotates as its teeth mesh with those of the internal ring gear 160 and in turn drives the drive pinion 162.

The drive pinion 162, as it rotates, also meshes with another gear 170 which constitutes the output gear for the first stage. A second planet idler pinion 172 is connected by a bolt 174 and bushing 176 to the first stage output gear 170. The nature of this connection mandates that the second planet idler pinion gear 172 orbit about the center of rotation of the first stage output gear 170 while being free to rotate about its own axis due to its meshing engagement with a second internally toothed ring gear 178. This second internal ring gear is rigidly fixed to the gear housing 146.

A second pinion carrier 180 is also connected to the first stage output gear 170, as by a bolt 171. A second drive pinion 182 is rotatably mounted on a bushing 184 in this carrier 180. The carrier maintains an exact relationship between the positions of the second drive pinion 182 and the second planet idler pinion 172. The drive pinion 182 extends past the face of the planet idler pinion 172 and meshes wtih an output gear 186 which is connected to or formed on the end of an output shaft 188. The output shaft 188 is mounted in the output panel 144 by means of a bushing or bearing 190. A sprocket wheel 192 may be mounted on the output shaft 188 to effect the rotational output.

The speed reduction ratio of the gear assemblies hereinbefore described may be altered greatly by changing only the output gear. For example, using the apparatus shown in FIG. 1, if the internal ring gear has 63 teeth and the output gear has 62 teeth, the reduction ratio would be 62/(63−62) or 62:1. The ratio may be reduced to 2:1 by changing the 62 tooth output gear with one having 42 teeth. The number of teeth in the planet idler pinion and the drive pinion do not enter the calculations so there is no compatibility needed between the number of teeth they have and the number the internal ring gear and output gear each has.

I claim:

1. A gear assembly which comprises, a frame for supporting the assembly, rotational input means rotatably supported by said frame; an internally toothed ring gear fixed to said frame, an idler pinion in mesh with said internally toothed ring gear; coupling means for operatively coupling said rotational input means to said idler pinion; a pinion carrier for rotatably mounting said idler pinion therein; a drive pinion rotatably mounted in said pinion carrier in mesh with said idler pinion, and an output gear coaxial with said input means and in mesh with said drive pinion, whereby said idler pinion is rotated by said rotational input means to effect an orbiting of said carrier, and thereby said idler pinion and said drive pinion, within said ring gear due to the meshing engagement of said idler pinion and said ring gear, said orbiting of said drive pinion and said meshing engagement of said drive pinion and said idler pinion being effective for altering the rolling center of said drive pinion to incur a speed reduction between said rotational input means and said output gear.

2. A gear assembly as claimed in claim 1, wherein said coupling means includes a flange secured to said rotational input means and rotatable mounting means supported thereon for rotatably mounting said idler pinion to said flange.

3. A gear assembly as claimed in claim 1, wherein said coupling means includes an input pinion mounted on said rotational input means and in mesh with said idler pinion.

4. A gear assembly as claimed in claim 3, wherein a second idler pinion is rotatably mounted in said pinion carrier in mesh with said internally toothed ring gear and said input pinion, and a second drive pinion is rotatably mounted in said pinion carrier in a fixed axial position with respect to said second idler pinion and in mesh therewith, said second drive pinion also being in mesh with said output gear.

5. A gear assembly as claimed in claim 4 wherein said internally toothed ring gear is loosely secured to said frame.

* * * * *